United States Patent

Eydieux

[15] 3,673,655
[45] July 4, 1972

[54] MILLING CUTTERS WITH DETACHABLE BLADES

[72] Inventor: Marius Eydieux, Billancourt, France

[73] Assignee: Regie Nationale des Usines Renault, Billancourt, France

[22] Filed: May 18, 1970

[21] Appl. No.: 38,361

[52] U.S. Cl. ................................................29/105
[51] Int. Cl. ..............................................B26d 1/12
[58] Field of Search ............................29/105, 105 A

[56] References Cited

UNITED STATES PATENTS

| 1,445,448 | 2/1923 | Reisinger | 29/105 |
| 1,969,843 | 8/1934 | Head | 29/105 X |
| 2,001,021 | 5/1935 | Heard | 29/105 X |
| 2,586,428 | 2/1952 | Hartman | 29/105 |
| R22,891 | 6/1947 | Head | 29/105 |

Primary Examiner—Harrison L. Hinson
Attorney—Stevens, Davis, Miller & Mosher

[57] ABSTRACT

Front milling cutter of the detachable blade type comprising blade inserts fitted in peripheral notches of a cutter body and secured by means of screws, characterized in that the bottoms of said notches consist of flat faces tangent to a cone coaxial with the milling cutter and converging in the forward direction thereof, so that the cutting edges of the blades are relatively close to each other.

4 Claims, 2 Drawing Figures

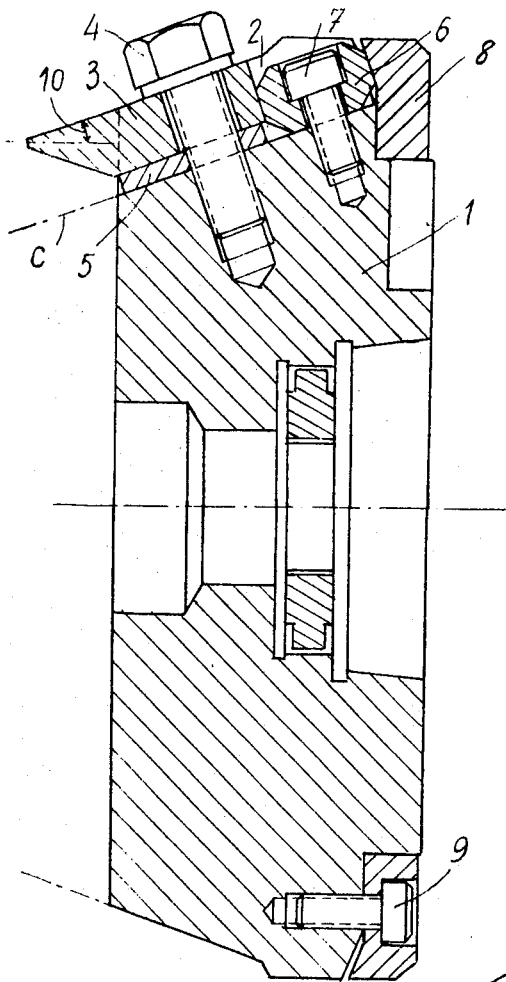
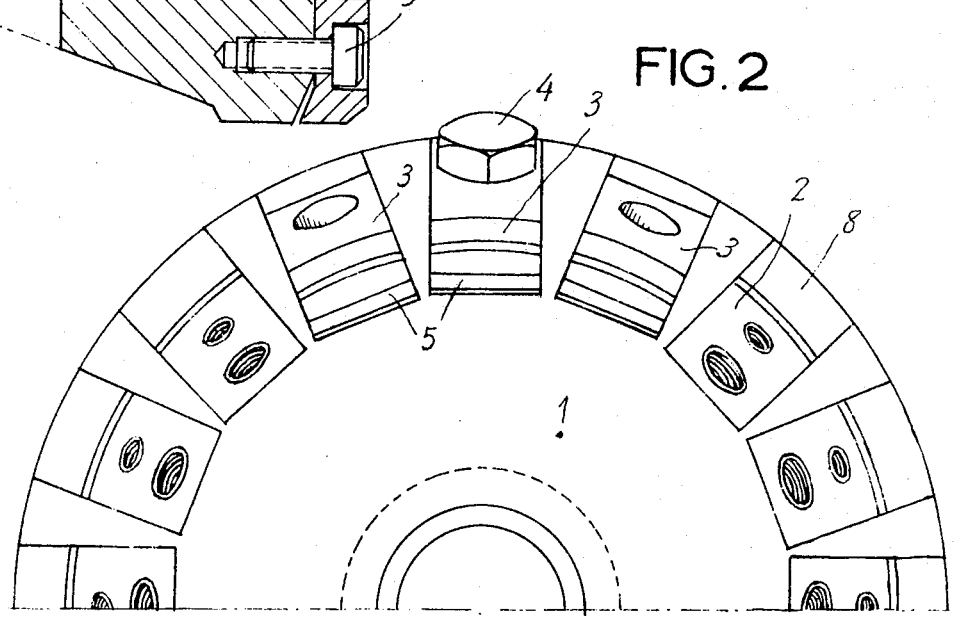
FIG.1
FIG.2

MILLING CUTTERS WITH DETACHABLE BLADES

This invention relates in general to milling cutters and has specific reference to milling cutters of the insert or detachable blade type.

It is known that in the cutting of bevel, spiral and hypoid gears the reduction in the milling cutter diameter on the one hand and the increased production rates of modern machines on the other hand are a source of difficult problems concerning the tool shape and fastening method.

At present in milling cutters with blade inserts these are secured in notches having a bottom parallel to the axis of the milling cutter body. The vertical positioning of the tooth is provided by a heel portion disposed either in front of, or behind, the cutting face or edge of the tooth.

Due to their shape, these inserts are relatively expensive; in addition, the constant increment in the production rate of modern machines makes it compulsory to increase the number of blades in a same cutter, and with the present trend of milling cutter design it is difficult to meet these contradictory requirements without impairing the strength of the assembly.

An advantageous solution to these problems is brought by the present invention which provides a front milling cutter having blade inserts fitted in peripheral notches of the milling cutter body and secured therein by means of screws, this cutter being characterized in that the bottoms of these notches are shaped to constitute flat faces tangent to a cone coaxial to the cutter and converging in a forward direction in relation thereto, whereby the cutting edges of said blades are relatively close to each other.

This design is attended by the following advantages:

a greater number of blades can be used for a given diameter;

the milling cutter constitutes nevertheless a rigid unit as in the case of one-piece milling cutters;

an intermediate, shape-modifying blade can be positioned between the external and internal cutting areas for rough-milling gear wheels, a feature difficult to achieve with one-piece milling cutters;

the blades are considerably cheaper and may be cut from rectangular-sectioned stock bars easy to grind and standardize.

Moreover, by resorting to the tapered inclination to the notch bottoms which corresponds to the external pressure angle of the blades, it is possible to avoid the operation consisting in giving a predetermined contour to the corresponding blade face, thus reducing inasmuch the blade machining time.

Thus, the cost of these blades, constituting the wearing portion of the milling cutter, can be reduced considerably without appreciably increasing the cost of the cutter body and of its accessories constituting the permanent or non-wearing portion of the tool.

An exemplary form of embodiment of the milling cutter according to this invention will now be described with reference to the attached drawing in which:

FIG. 1 is an axial section of the milling cutter according to this invention, and FIG. 2 is a fragmentary front view of the cutter, wherein some notches are shown without and the others with their inserts.

The milling cutter illustrated in the drawing comprises a cylindro-conical cutter body 1 having formed at spaced intervals in its outer periphery a plurality of notches 2 extending parallel to the axis of said body and having their bottoms constituted by flat faces tangent to a cone having the same axis as the cutter and converging towards the front thereof, as shown only partially by the dash and dot line C.

The notches are positioned in close relationship on the front face of the milling cutter, so that for a given diameter at this position a maximum number of blades or insert tools can be fitted as clearly apparent from FIG. 2.

In each notch 2 a blade 3 is secured by means of a screw 4 and precise radial positioning of the blade 3 is obtained if necessary by providing a shim 5 also receiving the fastening screw 4 therethrough, the axial positioning being obtained by the engagement of this blade 3 against a roller 6 secured by means of another screw 7 engaging a tapped hole in the rear portion of the notch bottom, all the rollers bearing against a common ring 8 centered on, and secured by screws 9 to, the body 1 of the milling cutter. Thus, a plurality of sets of such rollers are provided in order to cover the desired adjustment range, and it may be noted that these rollers are extremely cheap considering the easy and fast adjustment of the blades which can be obtained therewith.

It will be noted that by using a tapered inclination of the notch bottoms, as illustrated, which corresponds to the external pressure angle 10 of the blades or inserts 3, the latter can be cut and ground from simple rectangular-sectioned bar stock, thus avoiding the necessity of giving a special contour to the corresponding outer face of the blade.

Under these conditions it may be estimated that the reduction in cost of the milling cutter which is ascribable to the present invention corresponds to about 40 percent in comparison with the cost of a heel-type blade, that the total cost of this milling cutter with a set of, say, twelve blades is reduced by 30 percent in comparison with the cost of a one-piece milling cutter having the same number of blades, and that the useful life of the cutting tools for a same amount of wear exceeds by about 40 percent that of one-piece milling cutters having a same number of blades.

Of course, several modifications and variations may be brought to the specific and single form of embodiment shown and illustrated herein without departing from the basic principles of the invention as set forth in the attached claims.

What is claimed as new is:

1. A front milling cutter of the detachable blade type, comprising, a cutter body having notches in the periphery of said body, blade inserts fitted into said notches and secured to said body by screws, each notched portion of said body having a bottom face which is flat and tangent to a cone coaxial with the milling cutter, said faces converging toward the front of said cutter so that the cutting edges of the blades are closer to each other than their bases, each of said bottom faces lying in a plane which makes an angle with the axis of rotation of the cutter body which angle is substantially equal to the external pressure angle of the blades.

2. A front milling cutter according to claim 1, additionally comprising rear abutment rollers secured by screws into the bottom face of the notched portions of said cutter body, said rollers for axially positioning the blade inserts in said notched portions.

3. A front milling cutter according to claim 2, additionally comprising a bearing ring which is common to all of said abutment rollers and is coaxial with and secured to the cutter body.

4. A front milling cutter according to claim 1, additionally comprising shims located between the blade inserts and the bottom faces of the notched portions of said body, said shims adapted to receive fastening screws therethrough, and said shims for the radial adjustment of said blade inserts.

* * * * *

UNITED STATES PATENT OFFICE
CERTIFICATE OF CORRECTION

Patent No. 3673655  Dated July 4, 1972

Inventor(s) Marius EYDIEUX

It is certified that error appears in the above-identified patent and that said Letters Patent are hereby corrected as shown below:

Letters Patent will show the French priority

No. 69/18560 of June 5, 1969. (This was omitted from Letters Patent)

Signed and sealed this 30th day of January 1973.

(SEAL)
Attest:

EDWARD M. FLETCHER, JR.           ROBERT GOTTSCHALK
Attesting Officer                 Commissioner of Patents